R. L. WARNER.

SIGHT FOR FIREARMS.

APPLICATION FILED JAN. 26, 1915.

Reissued Nov. 9, 1915. 14,009.

Witnesses:

Elone Lawrence

Agnes M. Shea.

Inventor:

Robert L. Warner by George A. Rockwell,

Attorney

COLUMBIA PLANOGRAPH CO., WASHINGTON, D. C.

UNITED STATES PATENT OFFICE.

ROBERT L. WARNER, OF CONCORD, MASSACHUSETTS.

SIGHT FOR FIREARMS.

Specification of Reissued Letters Patent. Reissued Nov. 9, 1915.

14,009.

Original No. 1,051,791, dated January 28, 1913, Serial No. 678,284. Application for reissue filed January 26, 1915. Serial No. 4,570.

*To all whom it may concern:*

Be it known that I, ROBERT L. WARNER, of Concord, in the county of Middlesex and State of Massachusetts, have invented a new and useful Sight for Firearms, of which the following is a specification.

The main object of my invention is to provide means for raising as well as lowering the rear sight of a firearm and especially in firearms for hunting in cases where it is desirable to adjust the sight without looking at it.

My invention consists mainly in means for accomplishing this object.

A feature of my invention is a rotary stepped member to move the sight.

Figure 1:
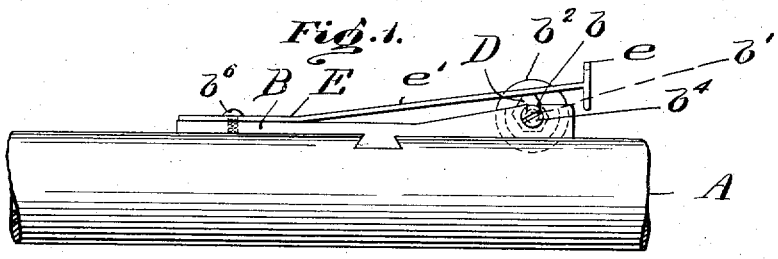
Figure 2:
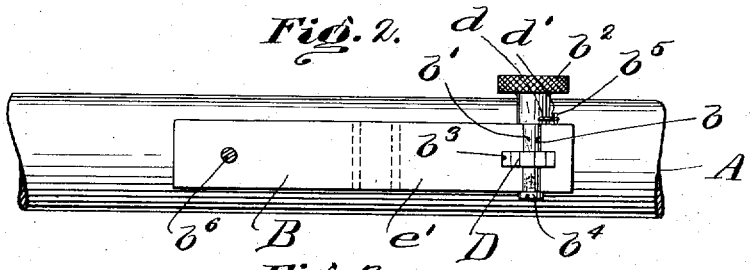
Figure 3:
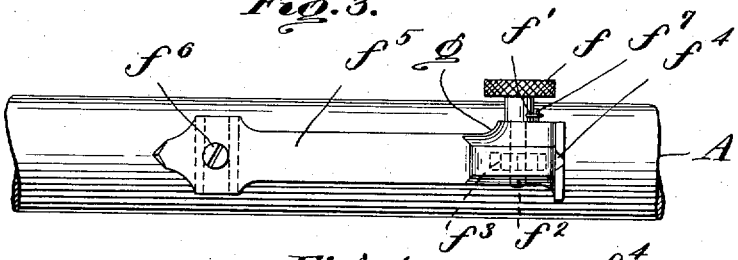
Figure 4:
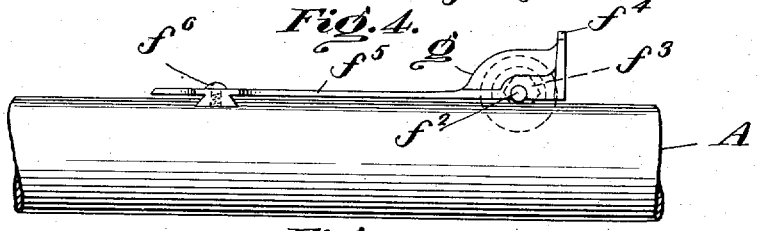
Figure 7:
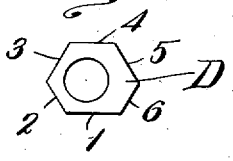
Figure 6:
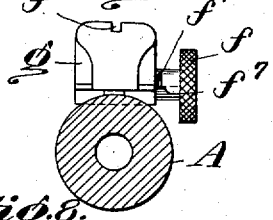
Figure 5:
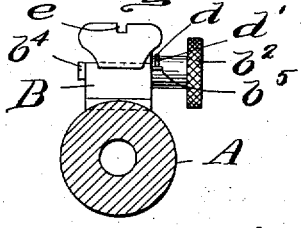
Figure 8:
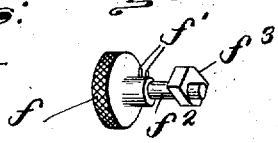

In the drawings, Figure 1 is an elevation of a portion of a firearm embodying my invention; Fig. 2 is a plan of the same without the sight; Fig. 3 is a plan of a modified form; Fig. 4 is an elevation of the modified form; Fig. 5 is an end elevation of the form of Fig. 1 looking from the right; Fig. 6 is an end elevation of the form of Fig. 3 looking from the right; Fig. 7 is an enlarged detail of the stepped member; and Fig. 8 is an enlarged perspective of the rotary member.

A represents a portion of the barrel of a rifle in dovetailed engagement with bearing member B. Mounted in slot $b$ of bearing B is shaft $b'$ rigidly connected to stepped member D and carrying turn-button $b^2$, a recess $b^3$ being provided to receive member D. A screw $b^4$ holds the shaft in the bearing. Member D is shown in enlarged detail in Fig. 7 and at its periphery has six flat faces or steps 1, 2, 3, 4, 5 and 6 although any suitable number may be provided. When member D is in place face 1 is nearest to the axis of the shaft, face 2 is slightly farther away, face 3 still farther and so on with the other faces, there being sharp corners between adjacent faces. A stop $b^5$ on member B engages stops $d$ $d'$ on handle $b^2$ to limit the rotary movement of the latter. Spring sight member E comprises a sighting portion $e$ and a flat spring portion $e'$, the latter being connected to bearing member B by screw $b^6$.

In Figs. 3, 4, 6 and 8 I show another embodiment of my invention, in which the turn-button $f$, stops $f'$ $f'$, shaft $f^2$ and stepped portion $f^3$ are all in one piece. Likewise the spring sight and bearing are in one piece which is provided with a hood $g$, a recess to receive portion $f^3$ and a slot to receive shaft $f^2$, the sighting portion being shown at $f^4$ and the spring portion at $f^5$, the latter being connected by screw $f^6$ to the barrel and being in dovetailed engagement with the barrel. In this form the stepped portion engages the barrel itself. Stop $f^7$ on the hood engages stops $f'$ $f'$ on the rotary member.

In using my device face 1 of the stepped member would normally engage the under side of the flat spring portion $e'$. If the user desires to shoot at an object at a distance of say one hundred yards he rotates the stepped member until face 2 engages said portion and if sighting for two hundred yards face 3 is brought into such engagement and so on, said distances being given merely as examples as of course, any convenient number of faces may be used for any desired distances, the angle made by adjacent faces giving a snap to the spring portion as it moves from engagement with one face into engagement with an adjacent face.

My invention is especially useful for hunters who desire to keep their eyes continually on the game and therefore desire adjusting means which may be operated without looking at it, it being clear that the operator can hear the click of the engagement between the spring and the stepped member as the latter is rotated and he can also feel the resistance as the spring portion passes over the several sharp corners between adjacent faces.

If the user should leave the spring in engagement with some intermediate face and then when he sees the game forget what the adjustment is he can rotate the stepped member until one of its stops engages the stop on the fixed member and he can then start the rotation and continue it until the desired adjustment is had and all this without losing sight of the game.

A great advantage of my device is that the rotary member is held firmly against rotation by the spring member and can not be turned accidentally so that I make sure that the sight will remain adjusted as desired and will not have its adjustment changed by twigs, boughs or the like.

Bearing B is to be considered a part of the firearm in its function of supporting the rotary member.

What I claim is:

1. A device of the character described comprising a spring carrying a sight; and a rotary member having a plurality of faces on its periphery, said faces being at progressively increasing distances from the axis of said member and being adapted for direct engagement with the spring to hold the sight at the desired elevation.

2. A device of the character described comprising a shaft; a disk eccentrically mounted on the shaft and formed with a plurality of flat faces on its periphery, said faces being at progressively increasing distances from the axis of said shaft; and a spring sight to engage each of said faces according to the adjustment desired.

3. A device of the character described comprising a sight; a firearm and a rotary member having its axis horizontal and crosswise of the firearm and having a plurality of faces on its periphery at progressively increasing distances from said axis to engage, and thereby adjust, the sight.

4. A device of the character described comprising a spring sight; a firearm and a rotary member having its axis horizontal and crosswise of the firearm and having a plurality of faces at different distances from its axis, each face being parallel to said axis, and being adapted to engage the spring sight according to the desired adjustment.

5. A device of the character described comprising a support adapted for connection with a barrel and having a slot and a recess; a shaft mounted to turn in said slot; a member movable in said recess, having a plurality of faces and rigidly connected to said shaft; a turn-button to rotate said shaft; and a flat spring connected near one end to said support and near its other end carrying a sight and being adapted near the latter end to engage each of said faces according to the adjustment desired and thereby maintain such adjustment.

6. A device of the character described comprising a barrel; a bearing having a slot and a recess; a shaft mounted to turn in said slot; a member rotatable in said recess, having a plurality of faces on its periphery at progressively increasing distances from its axis and rigidly connected to said shaft; a turn-button to rotate said shaft; and a spring having connection at one end with said barrel and near its other end carrying a sight and being adapted to engage each of said faces according to the adjustment desired and thereby maintain such adjustment.

7. A device of the character described comprising a spring sight; and a rotary member having a plurality of faces at progressively increasing distances from its axis to engage the sight and hold it at different elevations, movement of said member changing the position of the sight from a lower to a higher elevation, said spring holding said member against bodily movement with relation to the firearm proper.

8. A device of the character described comprising a firearm; a substantially straight spring member having a sight integral therewith and being adapted for connection to the top of the firearm and a rotary member having its axis horizontal and crosswise of the firearm and having a plurality of faces at different distances from said axis, said faces being adapted for direct engagement with said spring member, rotation of said rotary member changing the elevation of said sight and said spring member and holding the rotary member in the desired rotative position.

9. A sight for firearms comprising a sight member; a firearm; a rotary member pivoted in one of the two parts first named and having its axis crosswise of said fire arm and an operative periphery at progressively increasing distances from said axis and engaging the other of said two parts whereby the elevation of the sight member may be changed.

10. A sight for firearms comprising a sight member; a firearm; and a rotary member pivoted in one of the two parts first named and having its axis crosswise of said firearm and an operative periphery at progressively increasing distances from said axis and engaging the other of said two parts whereby the elevation of the sight member may be changed; and means to limit the rotation of the rotary member.

11. A sight for firearms comprising a sight member; a firearm; and a rotary member pivoted in one of the two parts first named and having its axis crosswise of said firearm and having a plurality of faces at progressively increasing distances from said axis and engaging the other of said two parts whereby the elevation of the sight member may be changed; and means to limit the rotation of the rotary member.

12. A sight for firearms comprising a spring sight member; a firearm; and a rotary member pivoted in one of the two parts first named and having its axis crosswise of said firearm and having a plurality of flat peripheral faces at progressively increasing distances from said axis and engaging the other of said two parts whereby the elevation of the sight member may be changed.

13. A sight for firearms comprising a sight member; a firearm; a rotary member pivoted in one of the two parts first named and having its axis crosswise of said firearm and having an operative periphery at progressively increasing distances from said axis and engaging the other of said two parts whereby the elevation of the sight member may be changed, said rotary member and one of the two parts first named cooperating to indicate to the user independently of his vision the elevation of the sight.

14. A sight for firearms comprising a spring sight member; a firearm; a rotary member pivoted in one of the two parts first named and having its axis crosswise of said firearm and having an operative periphery at progressively increasing distances from said axis and engaging the other of said two parts whereby the elevation of the sight member may be changed, said sight member and said rotary member coöperating to indicate to the user independently of his vision the elevation of the sight.

15. A sight for firearms comprising a sight member; a firearm; a rotary member pivoted in one of the two parts first named and having its axis crosswise of said firearm and having an operative periphery at progressively increasing distances from said axis and engaging the other of said two parts whereby the elevation of the sight member may be changed, said rotary member and one of the two parts first named coöperating to indicate to the user independently of his vision the elevation of the sight; and means to limit the rotation of the rotary member.

16. A sight for firearms comprising a sight member; a firearm; a rotary member pivoted in one of the two parts first named and having its axis crosswise of said firearm and having an operative periphery at progressively increasing distances from said axis and engaging the other of said two parts whereby the elevation of the sight member may be changed, said rotary member coöperating with the sight member to indicate to the user independently of his vision the elevation of the sight.

17. A sight for firearms comprising a sight member; a firearm; a rotary member pivoted in one of the two parts first named and having its axis crosswise of said firearm and having an operative periphery at progressively increasing distances from said axis and engaging the other of said two parts whereby the elevation of the sight member may be changed, said rotary member being held by the sight member in the desired position.

ROBERT L. WARNER.

Witnesses:
H. W. Rogers,
George A. Rockwell.

Copies of this patent may be obtained for five cents each, by addressing the "Commissioner of Patents, Washington, D. C."